United States Patent
Yokoyama et al.

(10) Patent No.: US 7,384,062 B2
(45) Date of Patent: Jun. 10, 2008

(54) AIRBAG SYSTEM

(75) Inventors: Aki Yokoyama, Shizuoka (JP);
Jyunichi Umehara, Shizuoka (JP);
Takashi Ueda, Shizuoka (JP);
Katsuhiro Tokita, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 241 days.

(21) Appl. No.: 10/961,045

(22) Filed: Oct. 12, 2004

(65) Prior Publication Data

US 2005/0161927 A1   Jul. 28, 2005

(30) Foreign Application Priority Data

Jan. 28, 2004 (JP) ............................. 2004-019647
Apr. 27, 2004 (JP) ............................. 2004-131510

(51) Int. Cl.
*B60R 21/26* (2006.01)
*B60R 21/207* (2006.01)

(52) U.S. Cl. .................. 280/730.2; 280/736; 280/742

(58) Field of Classification Search ................ 180/729, 180/730.1, 730.2, 743.1, 736, 740, 742
See application file for complete search history.

(56) References Cited

U.S. PATENT DOCUMENTS

| | | | |
|---|---|---|---|
| 5,524,924 A * | 6/1996 | Steffens et al. .......... 280/730.2 |
| 5,779,263 A * | 7/1998 | Lane et al. ............... 280/730.2 |
| 5,791,685 A * | 8/1998 | Lachat et al. ............ 280/743.1 |
| 5,853,191 A * | 12/1998 | Lachat .................... 280/730.2 |
| 6,059,311 A * | 5/2000 | Wipasuramonton et al. .......................... 280/729 |
| 6,270,113 B1 | 8/2001 | Wipasuramonton et al. |
| 6,349,964 B1 * | 2/2002 | Acker et al. ............. 280/730.2 |
| 7,021,652 B2 * | 4/2006 | Kumagai et al. .......... 280/729 |
| 7,168,733 B2 * | 1/2007 | Kumagai et al. ........ 280/730.2 |
| 2004/0130127 A1 | 7/2004 | Takeshi et al. |
| 2005/0062266 A1 * | 3/2005 | Steimke et al. .......... 280/730.2 |

FOREIGN PATENT DOCUMENTS

| | | |
|---|---|---|
| DE | 199 30 157 A1 | 1/2001 |
| DE | 102 11 232 A1 | 10/2003 |
| EP | 1 344 694 A | 9/2003 |
| EP | 1 433 667 A | 6/2004 |
| JP | 2000-85515 A | 3/2000 |
| JP | 2000-177527 A | 6/2000 |

* cited by examiner

*Primary Examiner*—Ruth Ilan
*Assistant Examiner*—Joseph Rocca
(74) *Attorney, Agent, or Firm*—Sughrue Mion, PLLC

(57) ABSTRACT

An airbag system includes an airbag having therein a plurality of chambers defined by a partition and a gas introduction portion arranged to face an end of the partition, an inflator having a gas supply portion and arranged opposite to the end of the partition for supplying gas to the gas introduction portion, and a passage arranged between the partition and the inflator and allowing fluid communication between the chambers.

16 Claims, 15 Drawing Sheets

AIRBAG SYSTEM

BACKGROUND OF THE INVENTION

The present invention relates to an airbag system including an airbag which deploys sideward with respect to a vehicular occupant.

A side-collision airbag system is provided to restrain a vehicular occupant or passenger by deploying an airbag sideward with respect to the occupant in the event of side collision of the automotive vehicle.

Such side-collision airbag system includes a side airbag so called, which is accommodated in the side of a vehicular seat and deploys between a seat occupant and a vehicular door to restrain occupant's chest and trunk.

The side airbag system comprises an airbag and an inflator accommodated in the rear side thereof for supplying gas to the airbag. The inside of the airbag is vertically partitioned by a dividing seam to define a first chamber for restraining occupant's trunk and a second chamber located above the first chamber and for restraining occupant's chest. The inflator is accommodated in a housing formed with a first opening communicating with the first chamber and a second opening communicating with the second chamber. A reinforcement is arranged at an inflator-side end of the dividing seam to achieve separation between the first and second chambers.

At deployment of the airbag, the internal pressures of the first and second chambers are made different to achieve appropriate restraint of the occupant. In this connection, refer to JP-A 2000-177527.

SUMMARY OF THE INVENTION

With the above side airbag system, airtightness of the inflator-side end of the dividing seam is achieved by simply butting the reinforcement on the housing. Then, it is difficult not only to maintain the airtightness against high-pressure gas supplied from the inflator, but also to set the pressures within the chambers at respective desired values.

It is, therefore, an object of the present invention to provide an airbag system which contributes to easy enhancement in airtightness of the chambers formed in the airbag and easy setting of the pressures within the chambers.

The present invention provides generally an airbag system, which comprises: an airbag including therein a plurality of chambers defined by a partition and a gas introduction portion arranged to face an end of the partition; an inflator arranged opposite to the end of the partition, the inflator supplying gas to the gas introduction portion, the inflator having a gas supply portion; and a passage arranged between the partition and the inflator, the passage allowing fluid communication between the chambers.

A main feature of the present invention is to provide an airbag, which comprises: a first chamber which deploys sideward with respect to a hip of a seat occupant; a second chamber located above the first chamber, the second chamber deploying sideward with respect to the seat occupant; and a gas guide device which guides gas introduced into the second chamber to an area of the airbag corresponding to a shoulder of the seat occupant.

BRIEF DESCRIPTION OF THE DRAWINGS

The other objects and features of the present invention will become apparent from the following description with reference of the accompanying drawings, wherein.

DETAILED DESCRIPTION OF THE INVENTION

Figure 1:
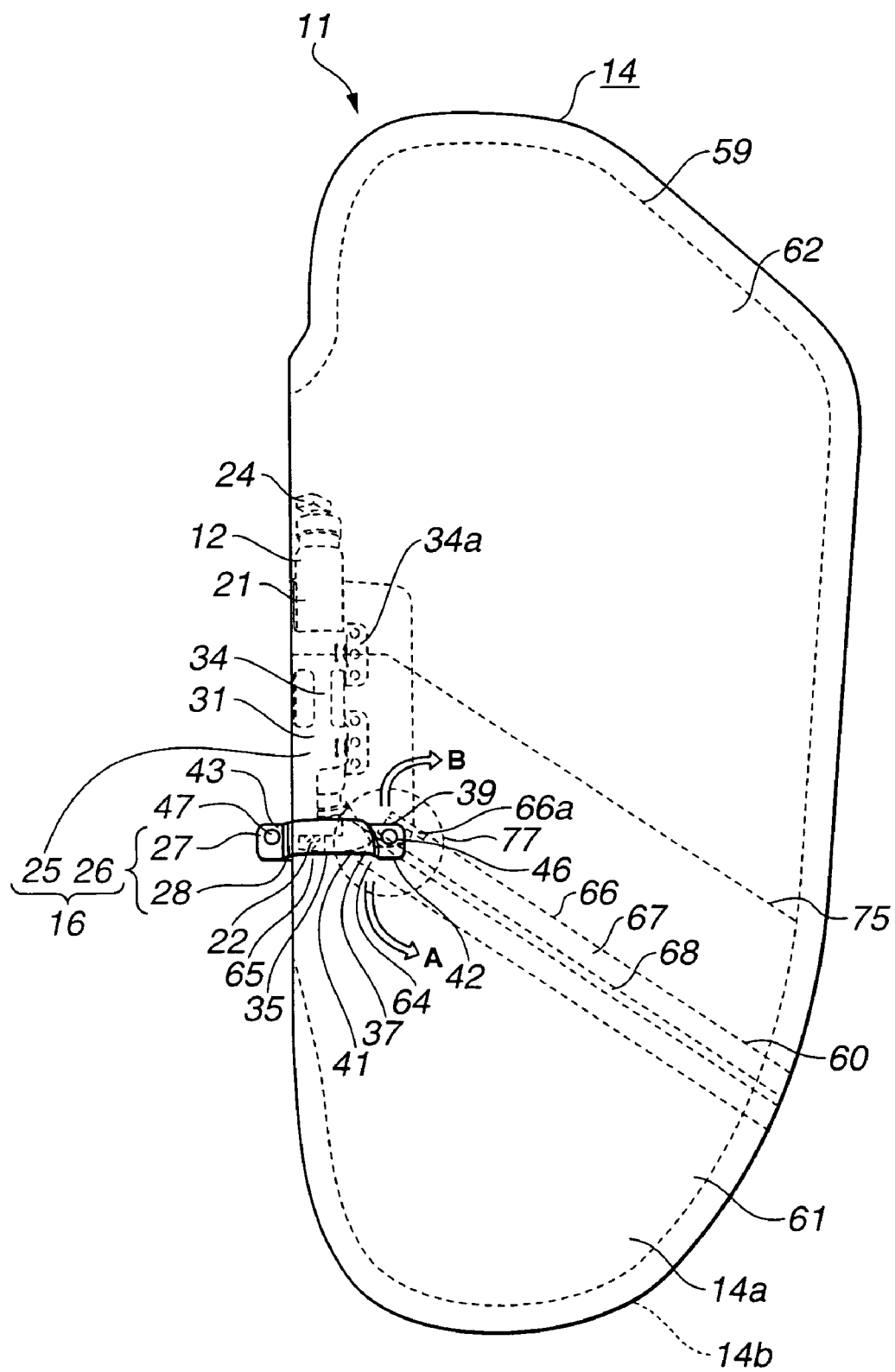
FIG. 1 is a side view showing a first embodiment of an airbag system in the deployed state.

Referring to the drawings, a description will be made about preferred embodiments of an airbag system according to the present invention.

Figure 2:
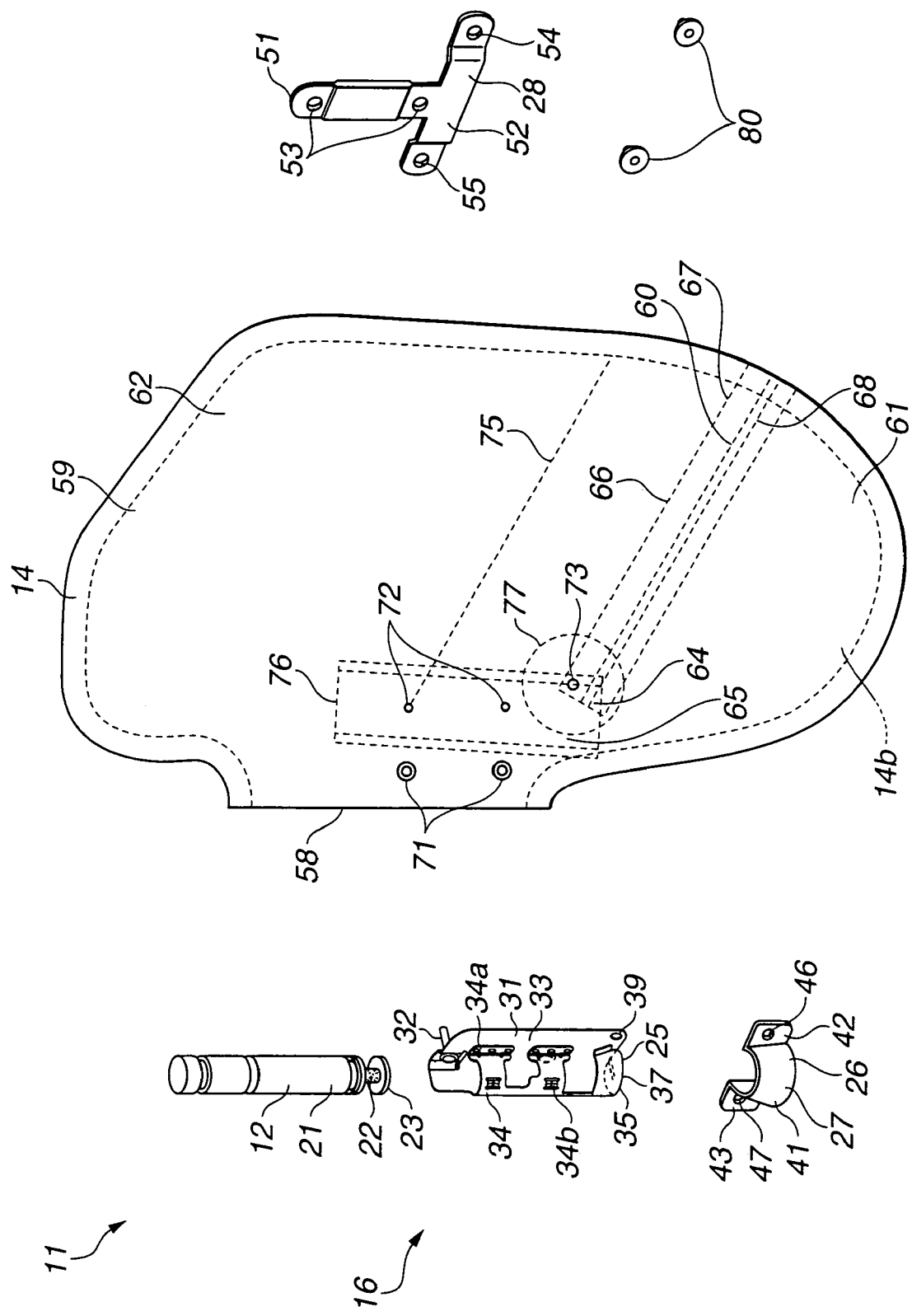
FIG. 2 is an exploded view showing the airbag system.
Figure 3:
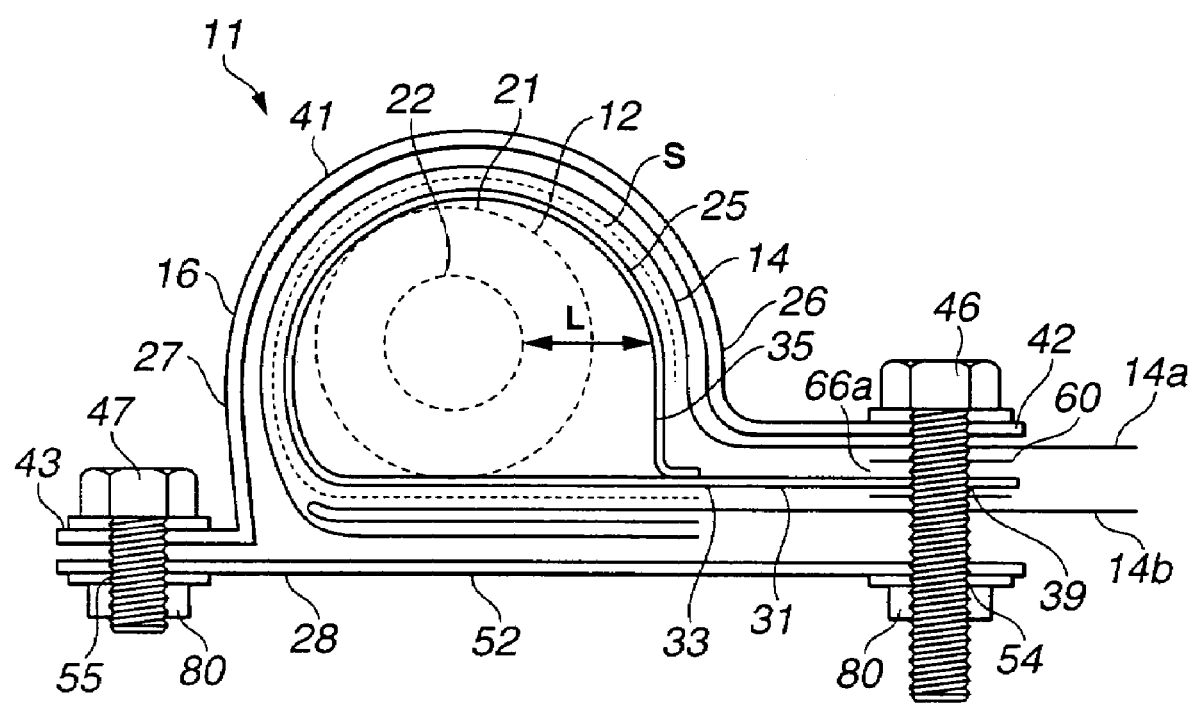
FIG. 3 is a sectional view showing the airbag system.

Referring to FIGS. 1-7, there is shown first embodiment of the present invention. Referring to FIGS. 1-3, an airbag system 11 is mounted to a vehicular seat or a member to be mounted, forming a side airbag so called, which deploys between a passenger seated on the seat and a vehicular door to restrain the passenger.

The airbag system 11 comprises an inflator 12 for generating and ejecting gas, an airbag 14 deployed by gas supplied from the inflator 12, a fixture 16 for coupling the inflator 12 and the airbag 14 so as to secure them to the seat, and a resin casing, not shown, serving as an enclosure for accommodating the members.

Referring to FIGS. 1-4, the inflator 12 comprises a roughly cylindrical main body 21 and a gas supply portion 22 protruding from one end of the main body 21. A terminal 23 is arranged at another end of the main body 21 to operate the inflator 12. The gas supply portion 22 includes a diffuser for supplying gas, and is shaped like a cylinder protruding from one end of the main body 21, having diameter smaller than or roughly equal to the diameter of the main body 21, and having peripheral surface formed with a plurality of round holes serving as gas discharge ports. A block-shaped top plate 24 is arranged at a distal end opposite to the gas supply portion 22. The inflator 12 is of the hybrid type so called, and serves to eject relatively low temperature gas from the gas supply portion 22 by reacting a propellant charged in the main body 21 and releasing gas stored in a bomb in the main body 21.

The fixture 16 comprises a retainer or inner fixture 25 and an outer fixture 26. The outer fixture 26 comprises a separator or first fixture 27 and a plate spacer 28 or second fixture engaged with the separator 27.

Figure 4:
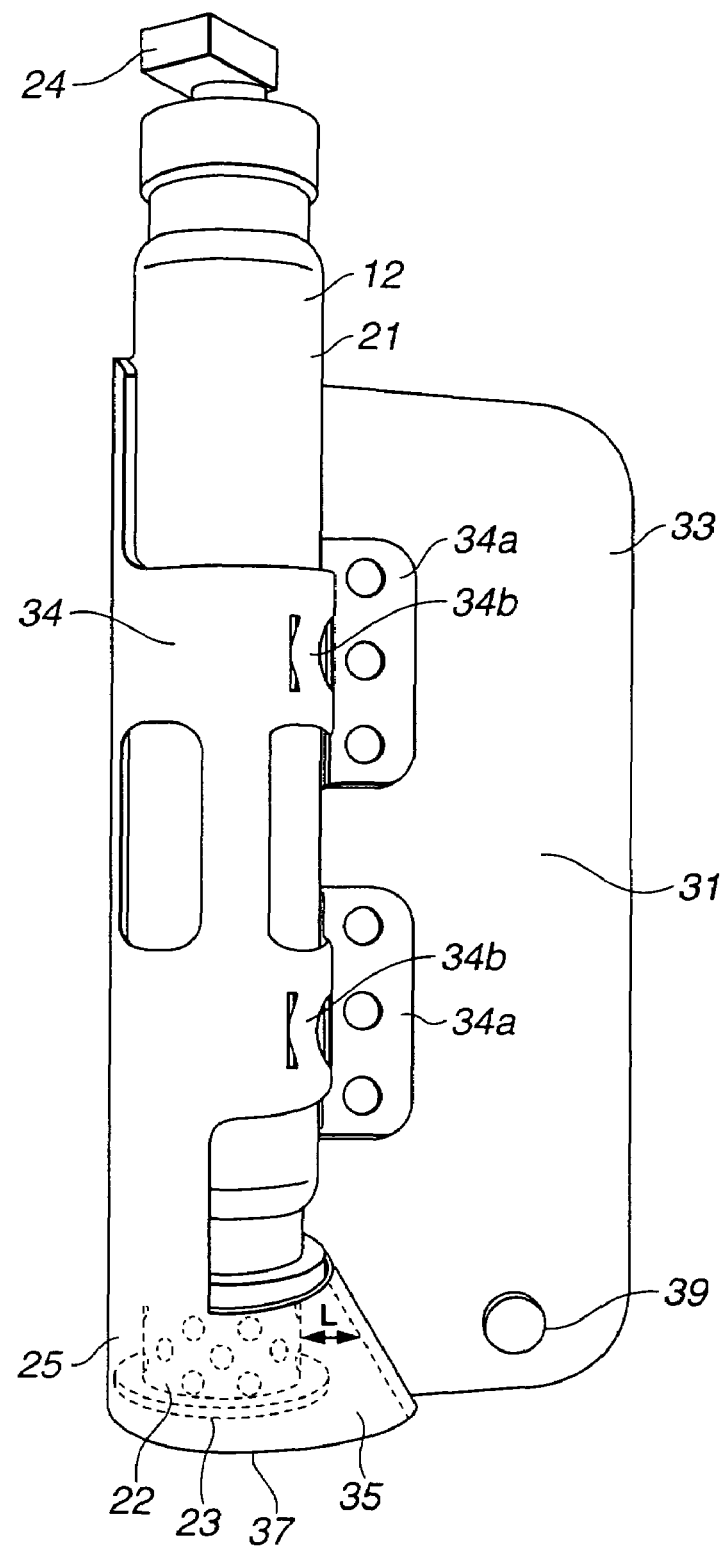
FIG. 4 is a perspective view showing an inflator and a retainer of the airbag system.
Figure 5:
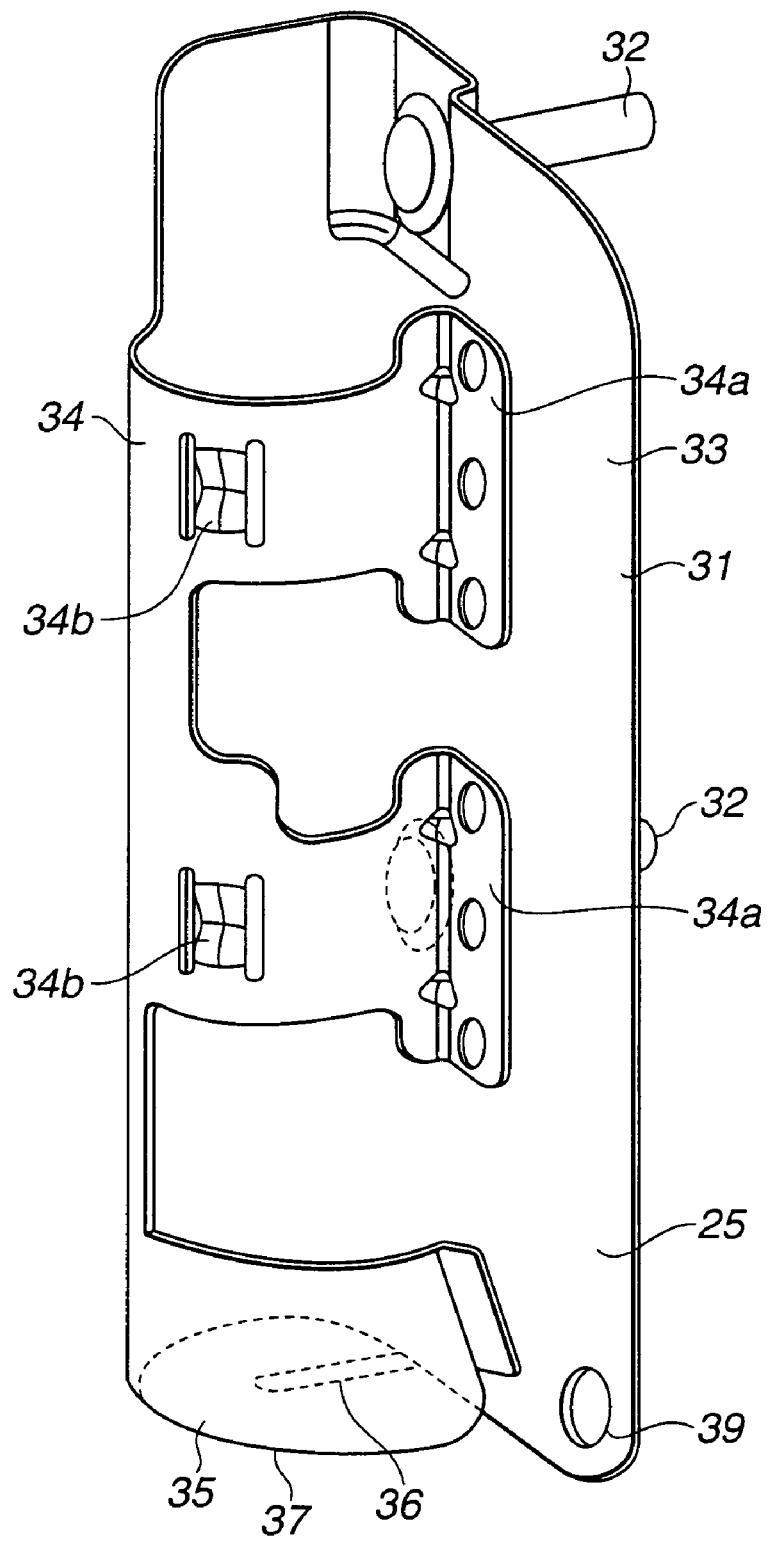
FIG. 5 is a view similar to FIG. 4, showing the retainer.

Referring to FIGS. 4 and 5, the retainer 25 comprises a retainer main body 31 obtained by bending a metal plate and two bolts or mounting means 32 secured to the retainer main body 31 by welding or the like. The retainer main body 31 comprises a roughly plate-shaped base 33, an inflator holder 34 integrally extending from the base 33, and an inner holding portion or internal airtight portion 35 integrally extending from the base 33. A stopper 36 is provided to the base 33 to protrude from an end of the inner holding portion 35 and abut on a distal end of the inflator 12 for positioning. The inflator holder 34 is curved roughly cylindrically to allow insertion of the main body 21 of the inflator 12 therein. The inflator holder 34 includes two fixing portions 34a arranged at a distal end and secured to the base 33 by rivets, not shown, and two positioning fixing portions 34b formed with the respective fixing portions 34a by cut and raise, etc., and resiliently abutting on the inflator 12 for positioning.

The inner holding portion 35, which is also referred to as a skirt, is shaped roughly cylindrically, and has an inner peripheral surface curved to form a gas guide 37 which faces, at a predetermined space L away, the gas supply portion 22 of the inflator 12 held by the inflator holder 34 as shown in FIGS. 3 and 4. The gas guide 37 is shaped like a truncated cone which expands in one direction with respect to the longitudinal direction or axial direction of the inflator 12. Specifically, the gas guide 37 is formed as an inclination inclined with respect to the gas supply portion 22 to distribute much gas to one direction than to another direction at a predetermined distribution rate. In the first embodiment, the gas guide 37 expands downward, i.e. toward the distal end of the inflator 12, to distribute much gas downward.

A round mounting hole 39 is formed in the base 33 of the retainer main body 31 in the vicinity of the inner holding portion 35.

Referring to FIGS. 1-3, the separator 27 is obtained by bending a metal plate, and comprises an outer holding portion or external airtight portion 41 constituting closing means or device and mounting pieces 42, 43 extending from both sides of the outer holding portion 41. The outer holding portion 41 is curved to allow close contact with the outer peripheral surface of the inner holding portion 35. Bolts or mounting/tightening means 46, 47 are arranged through and secured to the mounting pieces 42, 43 by welding or the like.

The plate spacer 28 is obtained by bending a metal plate, and is shaped, in the first embodiment, roughly like a letter T comprising a first piece 51 roughly along the longitudinal direction of the retainer main body 31 and a second piece 52 roughly along the longitudinal direction of the separator 27. The first piece 51 is formed with a pair of mounting holes 53 for engaging with the bolts 32 of the retainer main body 31, whereas the second piece 52 is formed with a pair of mounting holes 54, 55 for engaging with the bolts 46, 47 of the separator 27.

The airbag 14 is constructed by sewing one or a plurality of basic cloths or panels. In the first embodiment, two basic cloths 14a, 14b of substantially the same shape are superimposed one upon another as shown in FIG. 3, and are sewn together at a sewing portion 59 located in the vicinity of the outer periphery as shown in FIG. 2 except a portion corresponding to an opening 58 serving as a parts insertion portion, thus obtaining an outer shell of a flat bag. A linear partition 60 having a base end placed on the sewing portion 59 is arranged inside the bag to substantially airtightly define a hip restraining chamber or first chamber 61 located below the partition 60 and a chest restraining chamber or second chamber 62 located above the partition 60. A gas introduction portion 65 serving as an inflator accommodation is formed to face an end 64 of the partition 60 on the side of the opening 58. Specifically, the partition 60 allows substantially airtight division of the hip restraining chamber 61 and the chest restraining chamber 62, wherein the hip restraining chamber 61 and the chest restraining chamber 62 are in fluid communication through the gas introduction portion 65 only.

The partition 60 can be obtained by simply sewing the basic cloths 14a, 14b together. In the first embodiment, an elongate rectangular intermediate basic cloth 67 having an upper end as a bend line 66 is sewn, in the vicinity of both side edges, to the basic cloths 14a, 14b along the longitudinal direction, i.e. a sewing line 68, providing slight allowance to the airbag 14. With this, the airbag 14 deploys flat with a predetermined width.

As shown in FIG. 2, the airbag 14 has a plurality of mounting holes, i.e. two pairs of mounting holes 71, 72 formed at the gas introduction portion 65 and a mounting hole 73 formed at the partition 60 in the vicinity of the end 64. The external mounting holes 71 arranged adjacent to the opening 58 and paired vertically and the mounting hole 73 arranged at the end 64 of the partition 69 are formed through the superimposed basic cloths 14a, 14b, whereas the internal mounting holes 72 arranged distant from the opening 58 and paired vertically are formed through the basic cloth 14b only.

A reinforcing cloth, which is referred to as a flameproof cloth in some cases, is superimposed and sewn to each of the basic cloths 14a, 14b. In the first embodiment, for example, a reinforcing cloth 75 for protecting the lower side of the airbag 14 and a reinforcing cloth 76 arranged in the vicinity of the gas introduction portion 65 are sewn to the basic cloths 14a, 14b, respectively. Moreover, a circular reinforcing cloth 77, which is arranged coaxially with the mounting hole 73 formed at the end 64 of the partition 60, is sewn to the basic cloths 14a, 14b.

Next, the assembling process of the airbag system 11 will be described.

First, the inflator 12 is inserted into the inflator holder 34 of the retainer 25. With the inflator 12 positioned by the stopper 36, the fixing portions 34a are secured to the base 33 by the rivets. Then, the inflator holder 34 makes press contact with the inflator 12, and the positioning holding portion 34b engages in a concave of the main body 21 of the inflator 12, achieving positioning and holding of the inflator 12, thus obtaining an assembly of the inflator 12 and the retainer 25.

Next, the assembly is inserted into the airbag 14 through the opening 58, and the bolts 32 are drawn outside through the internal mounting holes 72. Then, the airbag 14 is folded back at the opening 58 to insert the bolts 32 into the external mounting holes 71.

In this state, part of the base 33 of the retainer main body 31 is inserted into a recess 66a formed at the end 64 of the intermediate basic cloth 67 which constitutes the partition 60 and along the bend line 66, aligning the mounting hole 39 of the base 33 with the mounting hole 73 of the airbag 14.

Moreover, in this state, the separator 27 is disposed on one side of the airbag 14, and the plate spacer 28 is disposed on another side of the airbag 14, wherein the separator 27 and the plate spacer 28 cooperate to hold the airbag 14 together with the retainer 25. Specifically, the bolt 46 of the separator 27 is inserted into the mounting holes 73, 39, and the bolt 47 is disposed outside the airbag 14. And the bolts 46, 47 of the separator 27 and the bolts 32 of the retainer 25 are inserted into the mounting holes 54, 55, 53 of the plate spacer 28, respectively, to engage with nuts or securing/fastening devices 80 for tightening.

FIG. 3 shows a state that the members are separated from each other, with the bolts 46, 47 and the nuts 80 not tightened completely, for explaining the structure. In the actual state, the mounting pieces 42, 43 of the separator 27 and the plate spacer 28 make press contact with each other, and the outer holding portion 41 of the separator 27 and the inner holding portion 35 of the retainer 25 also make press contact with each other.

Figure 6:
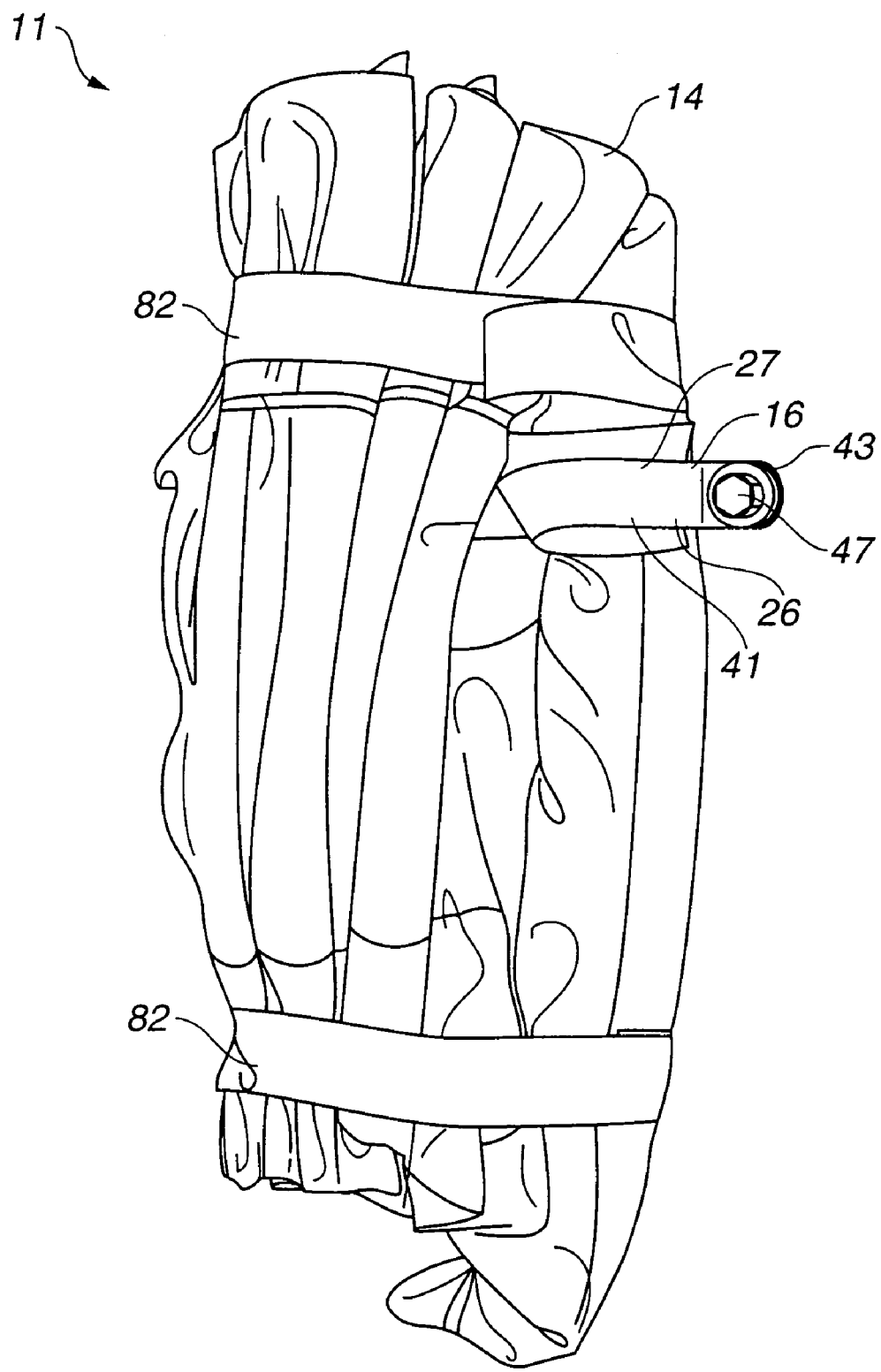
FIG. 6 is a view similar to FIG. 5, showing the airbag system in the folded state.
Figure 7:
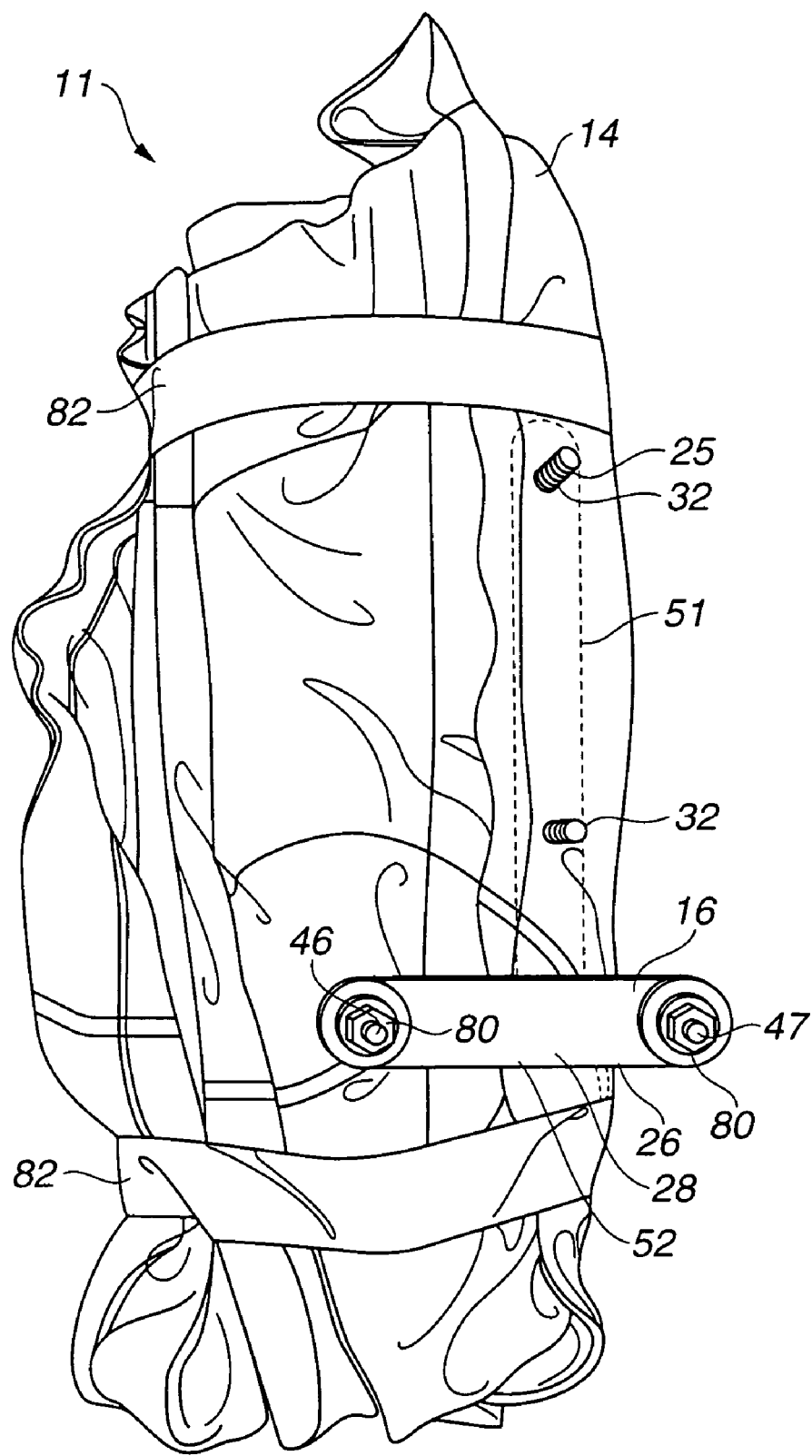
FIG. 7 is a view similar to FIG. 6, showing the airbag system in the folded state.

Referring to FIGS. 6 and 7, the airbag 14 is folded in an appropriate shape, which is maintained by tapes or shape preserving means 82 which can be broken readily, thus obtaining the airbag system 11.

The airbag system 11 is accommodated in a casing, not shown, and then accommodated in the side of the seat. By engaging the bolts 32 of the retainer 25 with a frame of the seat or the like using nuts, etc., the airbag system 11 is mounted to the seat.

Next, operation of the airbag system 11 at deployment will be described.

In the event that the vehicle undergoes impact due to side collision and the like, a control unit actuates the inflator 12 to eject gas from the gas supply portion 22. Then, under the gas pressure, the airbag 14 opens the cover to protrude from the seat, deploying between the passenger and the door panel. More specifically, referring to FIG. 1, gas ejected from the gas supply portion 22 is guided by the gas guide 37 of the retainer 25, and is distributed vertically at a desired distribution rate to form a main flow A which goes downward and an auxiliary flow M which goes upward. The main flow A is directly supplied to the hip restraining chamber 61, and at the same time, the auxiliary flow B is directly supplied to the chest restraining chamber 62, deploying the chambers 61, 62, thus restraining the passenger.

In the first embodiment, the airbag 14 is held from the outside, together with the inner holding portion 35 of the retainer 25, by the separator 27 and plate spacer 28 which contact the partition 60 of the airbag 14 and constitute the fixture 16. This allows closing of the airbag 14 through close contact of the airbag 14 with the inner holding portion 35 over the entire periphery, i.e. preservation of airtightness of the end 64 of the partition 60.

In such a way, in the first embodiment, the side airbag for restraining passenger's chest and hip is designed to hold, from the outside, the airbag 14 together with the inner holding portion 35 of the retainer 25 and further part of the partition 60, i.e. the end 64, by the separator 27 and plate spacer 28 which contact the partition 60 of the airbag 14 and constitute the fixture 16. This allows close contact of the airbag 14 with the inner holding portion 35, i.e. preservation of airtightness of the end 64 of the partition 60.

Then, airtightness of the partition 60 for defining the hip restraining chamber 61 and the chest restraining chamber 62 can readily be enhanced to secure airtightness of the chambers 61, 62 against high-pressure gas supplied from the inflator 12. Thus, even when single inflator 12 is adopted, the gas pressures to be supplied to the chambers 61, 62 can readily be controlled, resulting in easy achievement of desired optimum pressure characteristics or deployment characteristics. That is, the hip restraining chamber 61 is deployed with the gas pressure increasing quickly and having greater peak value, whereas the chest restraining chamber 62 is deployed with the gas pressure increasing relatively slowly and having relatively smaller peak value, allowing effective restraint of the passenger in accordance with the characteristics adapted to his/her body parts to be restrained.

Moreover, since the hip restraining chamber 61 and the chest restraining chamber 62 are in fluid communication through the space L between the gas supply portion 22 and the gas guide 37, distribution of gas can readily be made at a desired rate by the gas guide 37 which is an inner peripheral surface of the inner holding portion 35. That is, by adjusting, for example, an angle of inclination of the gas guide 37 with respect to the gas supply portion 22, the distribution rate of gas to the chambers 61, 62 can be adjusted readily. Further, the gas guide 37 is integrally formed on the inner peripheral surface of the inner holding portion 35 constructed to enhance airtightness, causing no increase in the number of parts, allowing easy suppression of manufacturing cost.

Figure 8:
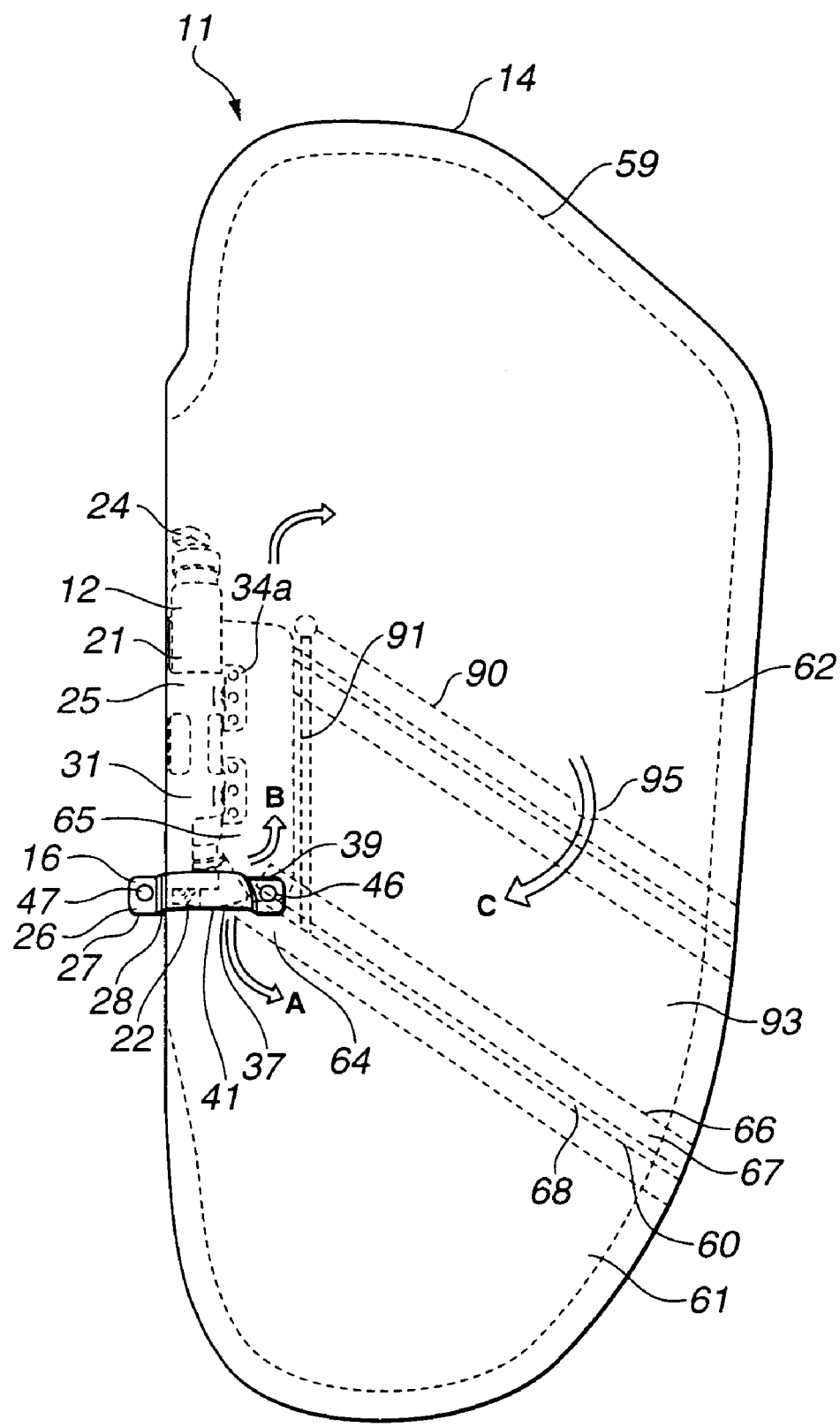
FIG. 8 is a view similar to FIG. 1, showing a second embodiment of the present invention.

In the first embodiment, the airbag 14 comprises two chambers, i.e. hip restraining chamber 61 and chest restraining chamber 62. Optionally, the airbag 14 can comprise three or more chambers. By way of example, referring to FIG. 8, in the second embodiment, the airbag 14 can comprise, in addition to the first partition 60, a second partition 90 arranged roughly parallel to the first partition 60 and a third partition 91 for closing ends of the partitions 60, 90 on the gas introduction portion 65, whereby an abdomen restraining chamber or third chamber 93 is arranged between the hip restraining chamber 61 and the chest restraining chamber 62. Moreover, a communication port 95 is formed through the second partition 90 to supply to the abdomen restraining chamber 93 through the chest restraining chamber 62 as shown by arrow C the auxiliary flow B which has been supplied to the chest restraining chamber 62. Thus, in the second embodiment, passenger's hip, chest, and abdomen can be restrained effectively in accordance with desired characteristics. Moreover, even when the seat is provided with an armrest, effective restraint of the occupant can be ensured.

Referring to FIG. 3, in the illustrative embodiments, a packing S of soft material such as urethane, neoprene rubber or the like can be arranged, as occasion requires, in a site between the retainer 25, the separator 27, and the like as shown by broken line. This allows easy enhancement in contact condition between the airbag 14 and the fixture 16, resulting in easier improvement in airtightness. Optionally, the packing S may be arranged on the outer peripheral surface of the inner holding portion 35 of the retainer or on the inner peripheral surface of the separator 27.

Figure 9:
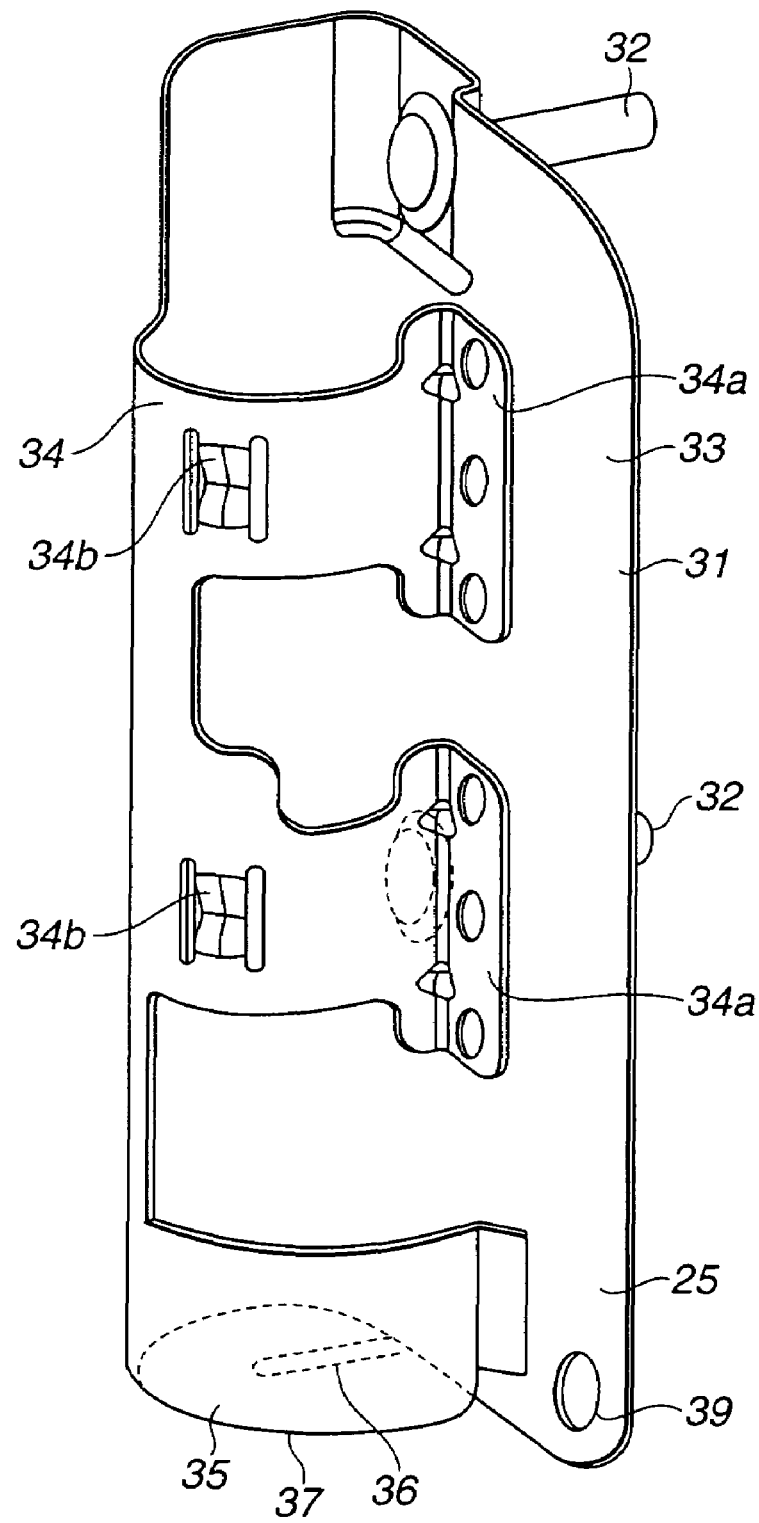
FIG. 9 is a view similar to FIG. 7, showing a variation of the retainer.

Further, adjustment of the distribution rate of gas to the chambers can be made, without relying on the inclined gas guide 37, by using the shape of the gas supply portion 22 of the inflator 12, for example. That is, referring to FIG. 9, in the variation, the gas guide 37 of the retainer 25 can be arranged to vertically face the gas supply portion 22 of the inflator 12.

Still further, the shape and structure of the inflator 12, retainer 25, and airbag 14 are not limited to those described in the illustrative embodiments, and may be set differently. By way of example, the inflator 12 may be of the pyro type so called, which supplies gas by the action of burning. The retainer 25 may be provided with cooling means or device for cooling gas supplied from the inflator 12. The airbag 14 may be formed with an exhaust port for discharging gas supplied from the inflator 12.

Furthermore, in the illustrative embodiments, the closing means for closing the airbag 14 through close contact of the basic cloth 14a of the airbag 14 with the inner holding portion 35 of the retainer 25 comprise outer holding portion 41 of the separator 27 which is a hardware constituting the outer fixture 26, wherein the outer holding portion 41 presses the basic cloth 14a against the inner holding portion 35. Alternatively, the closing means for airtightly closing the basic cloths 14a, 14b of the airbag 14 with respect to the inner holding portion 35 of the retainer 25 may be comprised of, together with or in place of the outer fixture 26, a thread or joining means for joining the basic cloths of the airbag 14 or a reinforcing cloth or sheet-shaped reinforcing member attached to the airbag 14.

Figure 10:
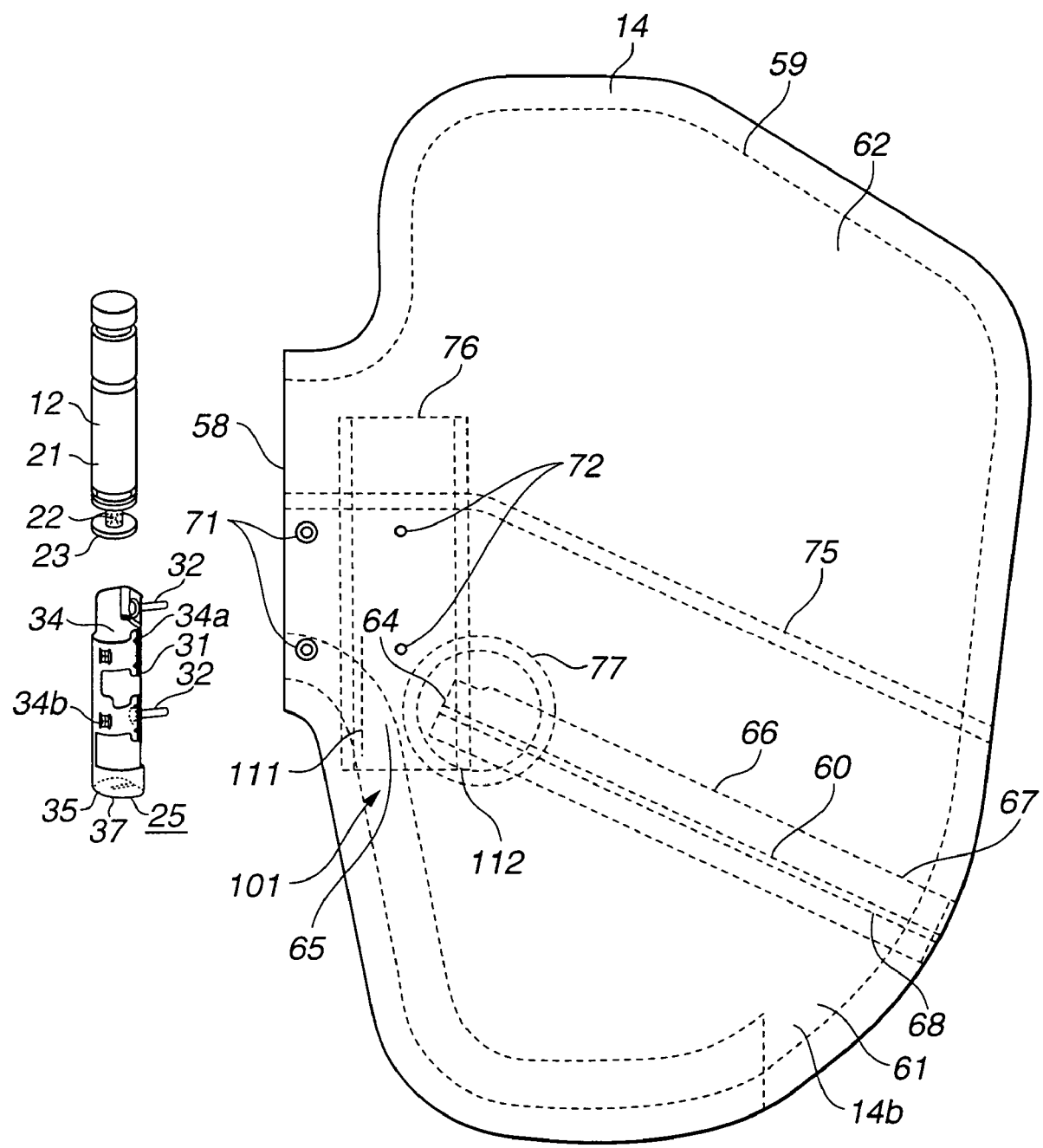
FIG. 10 is a view similar to FIG. 2, showing a third embodiment of the present invention.
Figure 11:
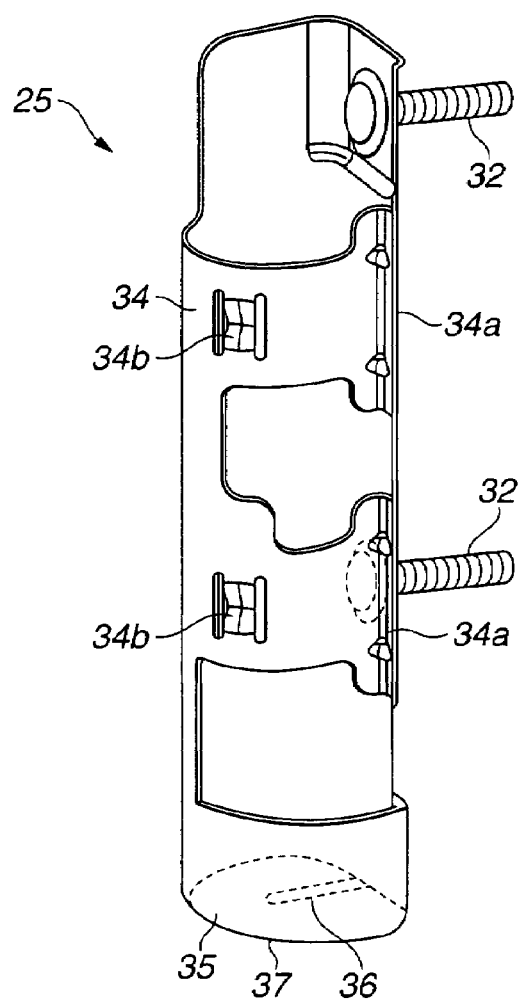
FIG. 11 is a view similar to FIG. 9, showing a retainer of the airbag system in FIG. 10.
Figure 12:
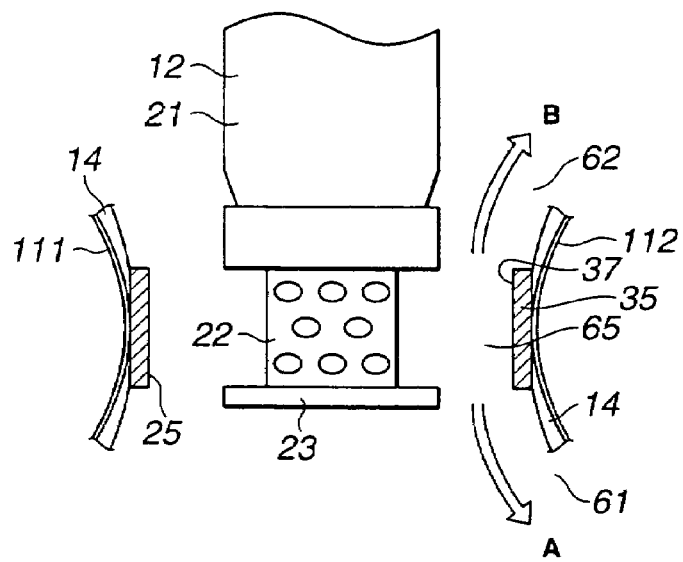
FIG. 12 is a schematic view showing operation of the airbag system in FIG. 10.

By way of example, referring to FIGS. 10-12, in the third embodiment, a back seal portion 101 for airtightly holding the inner holding portion 35 of the retainer 25 can be provided to the gas introduction portion 65 inside the airbag 14 with the outer fixture 26 shown in FIG. 1 being removed. The back seal portion 101 is obtained by sewing with thread the basic cloths 14a, 14b facing the gas introduction portion 65, i.e. joining the two at a pair of sewing portions 111, 112 arranged oppositely at a predetermined space. The back seal portion 101 serves as a kind of press fit portion into which the inner holding portion 35 can be press fit. The sewing portion 111 adjacent to the opening 58 is formed linearly substantially along the longitudinal direction of the inflator 12, whereas the sewing portion 112 distant from the opening 58 is formed concentric with the circular reinforcing cloth 77.

In the third embodiment, due to cancellation of the outer fixture 26, the retainer 25 is modified in shape as shown in FIG. 11, with the roughly plate-shaped base 33 and the mounting hole 39 thereof removed.

Figure 13:
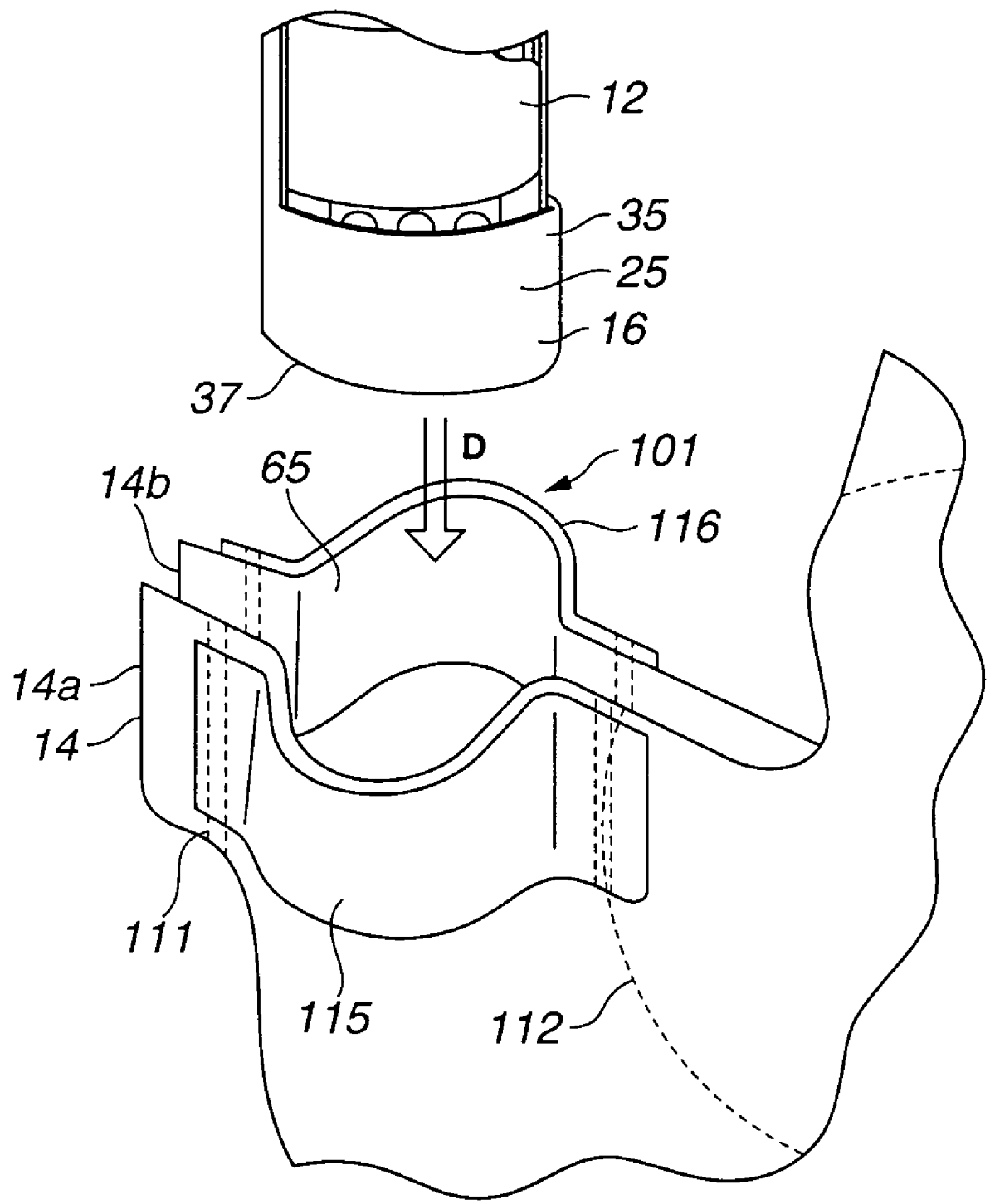
FIG. 13 is a view similar to FIG. 11, showing assembling of the airbag system in FIG. 10.

Referring to FIG. 13, the mounting method of the structure in the third embodiment will be described. The inner holding portion 35 of the retainer 25 with the inflator 12 mounted is moved in the direction of arrow D and press fit into the back seal portion 101, obtaining the inner holding portion 35 held by the back seal portion 101. Then, the two bolts 32 of the retainer 25 are inserted into the mounting holes 71, 72 of the airbag 14, positionally restraining the airbag 14 and the retainer 25, i.e. the inflator 12.

Referring to FIG. 12, when actuating the inflator 12, gas supplied from the gas supply portion 22 of the inflator 12 is guided by the gas guide 37 of the retainer 25 and divided vertically at a desired distribution rate to form the main flow A which goes downward or to the hip restraining chamber 61 and the auxiliary flow B which goes upward or to the chest restraining chamber 62, deploying the chambers 61, 62, thus restraining the passenger.

In such a way, in the third embodiment, a side airbag for restraining passenger's chest or chest and hip and comprising a distribution structure is provided wherein the inside of the airbag 14 is partitioned into a plurality of chambers to provide different pressure characteristics thereto. With the side airbag, the surroundings of the inner holding portion 35 of the retainer 35 are held by the sewing portions 111, 112 obtained by sewing the basic cloths 14a, 14b with thread, i.e. the sewing portions 111, 112 are added to the airbag 14 at a mounting site of the inner holding portion 35 of the retainer 25, i.e. the gas supply portion 22, resulting in great reduction in clearance between the inner holding portion 35 and the basic cloths 14a, 14b. This allows achievement of required airtightness and independence of the hip restraining chamber 61 and the chest restraining chamber 62 without relying on the outer fixture 26, restraining gas outflow between chambers 61, 62 from the high-pressure side to the low-pressure side, resulting in stable achievement of a desired pressure difference or reaction characteristics.

Further, the structure in the third embodiment allows not only a reduction in the number of parts and assembling processes and thus in manufacturing cost, but also weight saving as compared with the structure using the outer fixture 26 which is a hardware of steel.

In the third embodiment, the closing means comprise sewing portions 111, 112 obtained by sewing the basic cloths 14a, 14b of the airbag 14 with thread. Alternatively, the closing means may be in the form of the cloths 14a, 14b joined together by adhesion or the like.

Referring to FIG. 13, the side airbag may comprise reinforcing cloths or reinforcing members 115, 116 attached to the back seal portion 101 obtained by joining the basic cloths 14a, 14b of the airbag 14 together as occasion requires. Additional arrangement of the reinforcing cloths 115, 116 can restrain elongation of the basic cloths 14a, 14b around the inner holding portion 35, resulting in easy enhancement in airtightness.

The reinforcing members may be in the form of the reinforcing cloths 115, 116 including the same cloth as the basic cloths 14a, 14b of the airbag 14 and superimposed and sewn together, or in the form of appropriate sheet-shaped members.

Figure 14:
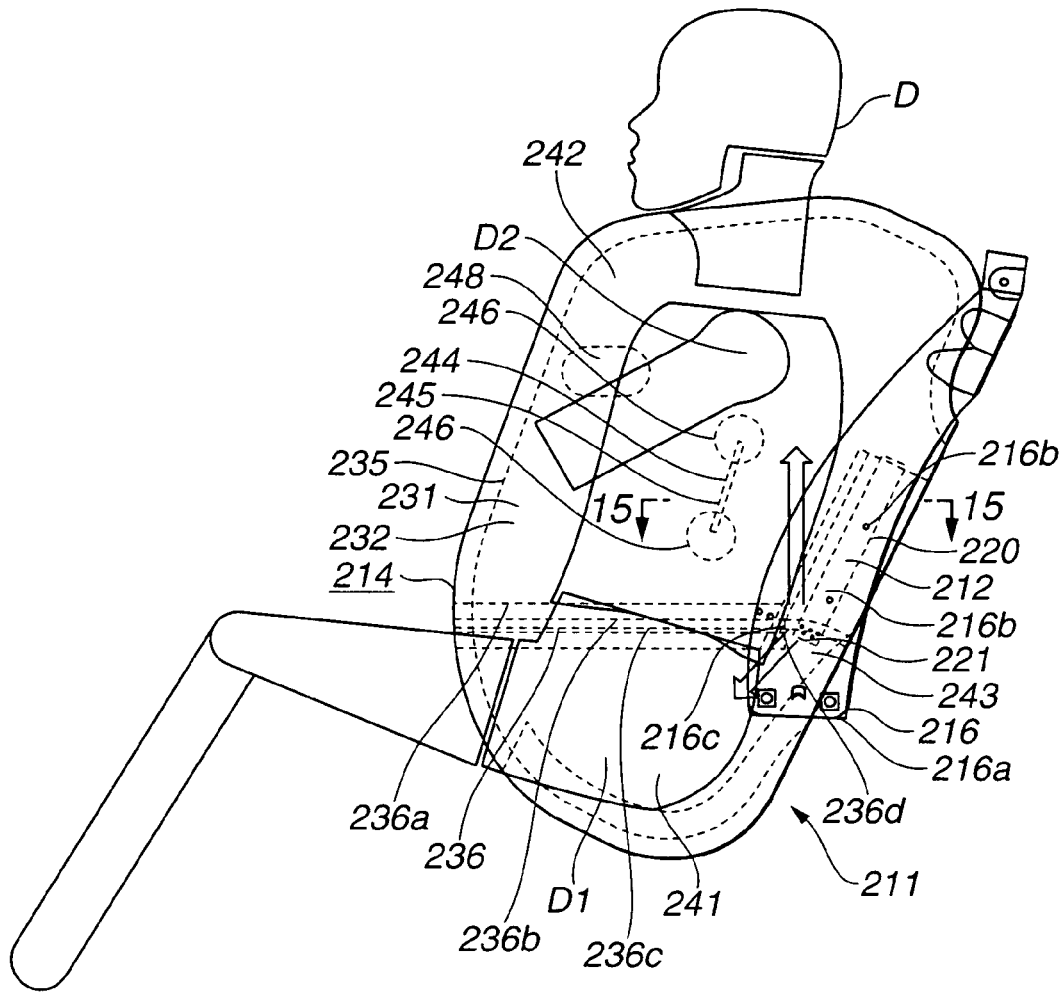
FIG. 14 is a view similar to FIG. 8, showing a fourth embodiment of the present invention.
Figure 15:
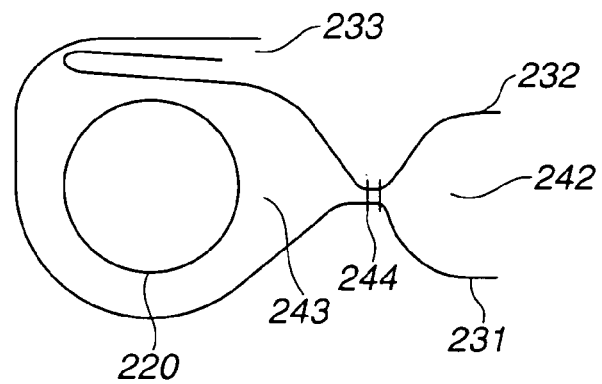
FIG. 15 is a view similar to FIG. 3, taken along the line 15-15 in FIG. 14.

Referring to FIGS. 14 and 15, there is shown fourth embodiment of the present invention. An airbag system 211 is mounted to the seat, forming the side airbag, which deploys between a passenger seated on the seat and the vehicular door to restrain the passenger. The passenger is shown by a dummy D having a hip D1 and a shoulder D2.

The airbag system 211 comprises an inflator 212 for generating and ejecting gas, an airbag 214 deployed by gas supplied from the inflator 212, a fixture 216 for coupling the inflator 212 and the airbag 214 so as to secure them to the seat, and a resin casing, not shown, serving as an enclosure for accommodating the members.

The inflator 212 comprises a roughly cylindrical main body 220 and a gas ejecting portion 221 arranged at one end or a lower end of the main body 220. The inflator 212 ejects gas from a plurality of openings formed in the peripheral surface of the gas ejecting portion 221 by reacting a propellant charged therein or releasing gas stored in a bomb arranged therein when an ignition signal is provided to a connector, not shown.

The fixture 216 comprises a retainer main body 216a obtained by bending a metal plate and two bolts or mounting means 216b secured to the retainer main body 216a by welding or the like. With the inflator main body 220 held by the retainer man body 216a, the inflator 212 is secured to the seat by the bolts 216b arranged through the airbag 214. The fixture 216 also comprises a retainer-side gas guide 216c arranged opposite to the gas ejecting portion 221 and for vertically distributing gas at a predetermined distribution rate. The retainer-side gas guide 216c is shaped like an inclined plate, for example.

The airbag 214 is constructed by sewing one or a plurality of basic cloths. In the fourth embodiment, two basic cloths 231, 232 of substantially the same shape are superimposed one upon another and sewn together at a sewing portion 235 located in the vicinity of the outer periphery except a portion corresponding to an opening 233 serving as a parts insertion portion, thus obtaining an outer shell of a flat bag. A linear partition 236 having a base end or front end placed on the sewing portion 235 is arranged inside the bag to substantially airtightly way define a hip restraining chamber or first chamber 241 located below the partition 236 and a chest restraining chamber or second chamber 242 located above the partition 236, achieving the airbag 214 of the two-chamber type so called. A gas introduction portion 243 is formed to face an end 236*d* of the partition 236 on the side of the opening 233. Specifically, the partition 236 allows substantially airtight division of the hip restraining chamber 241 and the chest restraining chamber 242, wherein the hip restraining chamber 241 and the chest restraining chamber 242 are in fluid communication through the gas introduction portion 243 only.

The partition 236 can be obtained by simply sewing the basic cloths 231, 232 together. In the fourth embodiment, an elongate rectangular intermediate basic cloth 236*b* having an upper end as a bend line 236*a* is sewn, in the vicinity of both side edges, to the basic cloths 231, 232 along the longitudinal direction, i.e. a sewing line 236*c*, providing slight allowance to the airbag 214. With this, the airbag 214 deploys flat with a predetermined width.

Gas guide means or device 244 for guiding gas is provided to the chest restraining chamber 242, and is obtained by sewing the basic cloths 231, 232 together. In the fourth embodiment, the gas guide means 244 comprise two sewing portions 245 which extend vertically and two protective sewing portions 246 which circularly surround upper and lower ends of the sewing portions 245 for protection. The gas guide means 244 serve to preferentially guide gas introduced into the chest restraining chamber 242 through the gas introduction portion 243 to an upper portion of the chest restraining chamber 242, i.e. an area corresponding to the passenger's shoulder D2, and form a kind of bypass or conduct structure between the upper portion of the chest restraining chamber 242 and the rear sewing portion 235 of the airbag 214.

In addition to the gas guide means 244, a restricting portion 248 is provided to the chest restraining chamber 242 to restrain the deployment dimension of the airbag 214 in the side direction. The restricting portion 248 is obtained by sewing the basic cloths 231, 232 together, for example.

Moreover, a reinforcing cloth, which is referred to as a flameproof cloth in some cases, is superimposed and sewn to each of the basic cloths 231, 232.

The airbag system 211 forms an assembly having inflator 212 and fixture 216 combined. When assembling the airbag system 211, the assembly is inserted into the airbag 214, and the bolts 216*b* are drawn outside. Then, the airbag 214 is folded in an appropriate state. In this state, the gas ejecting portion 221 of the inflator 212, which faces the retainer-side gas guide 216*c*, is disposed in the gas introduction portion 243 of the airbag 214. The airbag system 211 is accommodated in a casing, not shown, and then accommodated in the side of the seat. By engaging the bolts 216*b* of the fixture 216 with a frame of the seat or the like using nuts, etc., the airbag system 211 is mounted to the seat. The connector of the inflator 212 of the airbag system 211 is connected through a harness, not shown, to a control unit or control means provided to the vehicular body. The control unit comprising a CPU is connected to a sensor or sensors which provide an ignition signal for actuating the inflator 212 in accordance with the conditions of the passenger and collision. The sensors comprise a CCD camera and seat built-in weight sensor for sensing passenger's physique and position, a seat slide reclining sensor for sensing the longitudinal position and reclining condition of the seat, and the like. The sensors also comprise a collision detection sensor provided to the side of the vehicular body for sensing the collision condition.

In the event that the vehicle undergoes impact due to side collision and the like, the control means actuate, in accordance with sensing signals of the sensors, the inflator 212 in the condition appropriate to passenger's restraint, which ejects gas from the gas ejecting portion 221. Then, under the gas pressure, the airbag 214 opens the cover to protrude from the seat, deploying between the passenger and the door panel.

When ejected from the gas ejecting portion 221, gas is guided by the retainer-side gas guide 216*c*, and is distributed vertically at a desired distribution rate to form a main flow which goes downward and an auxiliary flow which goes upward. The main flow is directly supplied to the hip restraining chamber 241, and at the same time, the auxiliary flow is directly supplied to the chest restraining chamber 242, deploying the chambers 241, 242 by different reaction forces. At this time, since the main flow is larger in flow rate than the auxiliary flow, and the hip restraining chamber 241 is smaller in volume than the chest restraining chamber 242, the hip restraining chamber 241 deploys more quickly with larger reaction force than the chest restraining chamber 242, supporting quickly and surely the hip D1 having relatively great mass, achieving restraint of the dummy D. On the other hand, though the auxiliary flow is smaller in flow rate than the main flow, and the chest restraining chamber 242 is larger in volume than the hip restraining chamber 241, gas supplied to the chest restraining chamber 242 is quickly preferentially guided by the gas guide means 244 to an upper portion of the chest restraining chamber 242, deploying promptly the airbag 214 at an area corresponding to the shoulder D2 of the dummy D.

In such a way, in the fourth embodiment, due to further optimized gas flow, the airbag 214 can stably support the dummy D at two positions, i.e. a bone position of the hip D1 and a bone position of the shoulder D2. In order to sufficiently support the hip D1 having greater mass, a reaction force of the hip restraining chamber 241 should sufficiently be increased by higher gas pressure. Due to quick support of the surroundings of the shoulder D2, even if the hip D1 is supported by higher reaction force in a pushing way, the upper body of the dummy D can be supported in a stable position without being moved inclinedly.

Moreover, the use of a particular inflator is not needed, and the gas guide means 244 are obtained by sewing the basic cloths 231, 232, allowing achievement of the simplified structure, resulting not only in reduction in manufacturing cost, but also in easy weight and size saving of the airbag 214.

In the fourth embodiment, the gas guide means 244 fundamentally comprise vertically extending sewing portions 245, and serve to guide gas preferentially upward and supply it partly to the chest restraining chamber 242 from below the sewing portions 245. Optionally, the gas guide means 244 may be constructed as appropriate, having a gas distribution opening, side closed, coupling means or device also serving as the gas guide means 244, or the like.

Figure 16:
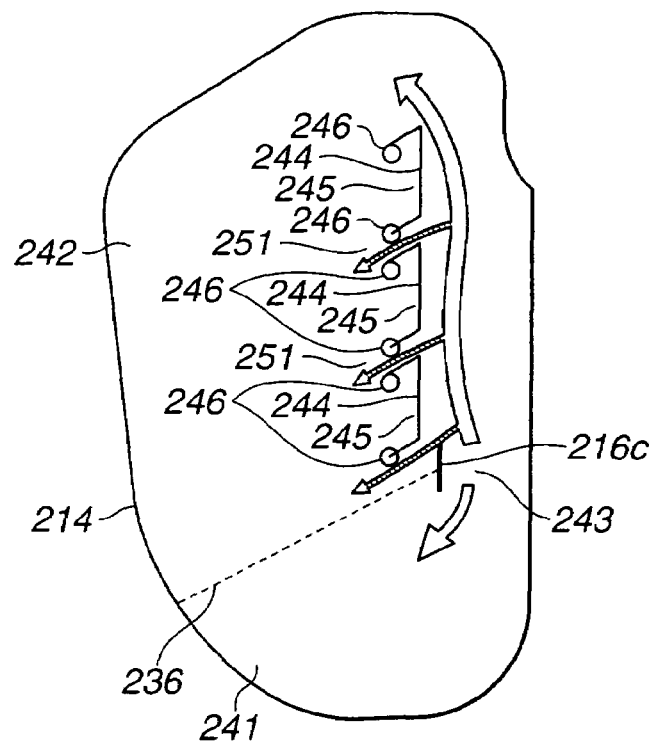
FIG. 16 is a view similar to FIG. 14, showing a fifth embodiment of the present invention.

Specifically, referring to FIG. 16, in the fifth embodiment, the gas guide means 244 can comprise sewing portions 245 arranged separate to each other. In the fifth embodiment, ends of each sewing portion 245 are bent forward or downstream, and have protective sewing portions 246. A section between the two adjacent sewing portions 245 is set as a gas distribution opening 251 for distributing gas in the chest restraining chamber 242.

Figure 17:
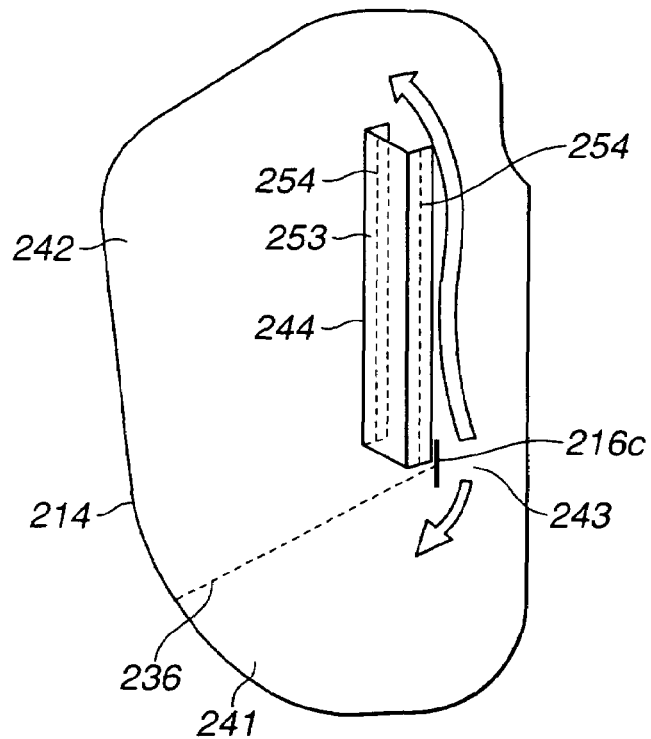
FIG. 17 is a view similar to FIG. 16, showing a sixth embodiment of the present invention.

Alternatively, referring to FIG. 17, in the sixth embodiment, the gas guide means 244 can also serve as coupling means or device 253 for restraining the dimension of the airbag 214 at deployment. Specifically, the coupling means 253, which are also referred to as a tether, are formed of the same cloth as the basic cloths 231, 232, and have both sides coupled to the basic cloths 231, 232 by sewing portions 254, respectively, thus restraining the dimension of separation of the basic cloths 231, 232. In the sixth embodiment, the member for defining the dimension of the airbag 214 at deployment to a predetermined value also serves as the member for guiding gas, achieving simplified structure, resulting in easy reduction in manufacturing cost.

Moreover, the inflator 212 or the fixture 216 can be constructed as appropriate.

Figure 18:
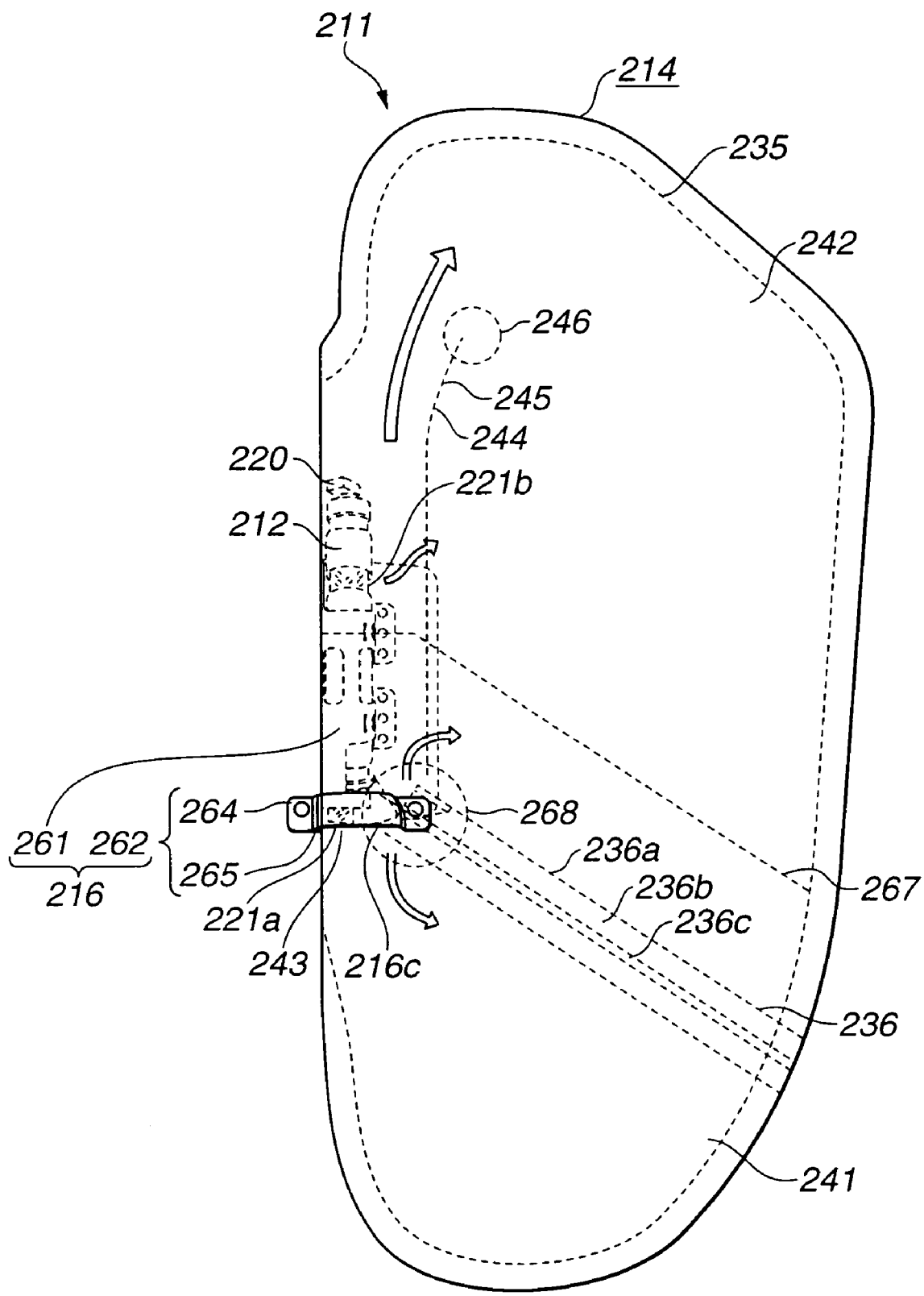
FIG. 18 is a view similar to FIG. 17, showing a seventh embodiment of the present invention.

Specifically, referring to FIG. 18, in the seventh embodiment, the inflator 212 can be a multi-squib inflator comprising a roughly cylindrical main body and a plurality of gas supply means or squibs provided thereto and for ejecting gas independently. Specifically, the multi-squib inflator 212 comprises first gas ejecting portion or first squib 221a provided at a lower end of the main body 220 and second gas ejecting portion or second squib 221b arranged slightly distant from an upper end of the main body 220, wherein the first gas ejecting portion 221a faces the retainer-side gas guide 216c, and the second gas ejecting portion 221b faces the gas guide means 244 in the chest restraining chamber 242. In the seventh embodiment, the first squib 221a forms a main or primary squib having greater output than that of the second squib 221b, and the output ratio between the first and second squibs 221a, 221b is set between 8:2 and 6:4.

The fixture 216 comprises a retainer or inner fixture 261 and an outer fixture 262. The outer fixture 262 comprises a separator or first fixture 264 and a plate spacer or second fixture 265 engaged with the separator 264. The separator 264 and the plate spacer 265 cooperate to hole the airbag 214 together with the retainer 261.

In the seventh embodiment, a reinforcing cloth 267 for protecting the lower side of the airbag 214 and circular reinforcing cloth 268 are sewn to the basic cloths 231, 232.

In the seventh embodiment, when the vehicle undergoes impact due to side collision and the like, the control means actuate, in accordance with sensing signals of the sensors, one squib in ordinary cases or two squibs as occasion requires in the condition appropriate to passenger's restraint (i.e. reaction force, etc.) to eject gas from the first gas ejecting portion 221a or the second gas ejecting portion 221b. As for the deployment pattern of the airbag 214 using two squibs, there are a first pattern in which only the first squib is actuated, a second pattern in which both the first and second squibs are actuated, and a third pattern in which only the second squib is actuated. The control means can select one of the patterns in accordance with the conditions of the passenger and collision. That is, using the inflator 212 of the multi-squib type and changing its output in accordance with sensing signals out of the vehicle allows change in shape and reaction-force characteristics of the airbag 214 having a plurality of chambers while simplifying the structure as compared with the structure using a plurality of inflators. This results in easy achievement of an optimum reaction force of the airbag 214 in accordance with the passenger's physique and position and the condition of collision. That is, though it is a general rule that the larger the passenger's weight and physique, the greater is a required reaction force, and the higher a vehicular collision velocity, the greater is a required reaction force, adoption of the multi-squib inflator 212 allows easy change in reaction forces of the chambers 241, 242 of the airbag 214, resulting in easy achievement of desired characteristics of the airbag 214.

In the illustrative embodiments, the airbag 214 comprises two chambers, i.e. hip restraining chamber 241 and chest restraining chamber 242. Optionally, the airbag 214 can comprise three or more chambers. By way of example, an abdomen restraining chamber or third chamber can be arranged between the hip restraining chamber 241 and the chest restraining chamber 242.

Moreover, in place of comprising two squibs, i.e. first and second squibs, the inflator 212 may comprise three or more squibs in accordance with the number of chambers, wherein the other squibs are actuated together with the first squib as occasion requires, supplying gas to the chambers. When arranging the abdomen restraining chamber, for example, the third squib can be provided to directly supply gas thereto. The squibs can be actuated at the same time or with a predetermined time lag under control of the control means. By way of example, the other squibs can be actuated laggedly with respect to the firs squib.

In the illustrative embodiments, the hip restraining chamber 241 and the chest restraining chamber 242, which are isolated substantially airtightly by the partition 236, are in fluid communication through the gas introduction portion 243 only. Optionally, a communication portion may be arranged in the partition 236 to allow gas passage between the chambers 241, 242.

Further, adjustment of the distribution rate of gas to the chambers 241, 242 can be made, without relying on the inclined gas guide 216c, by using the shape of the gas ejecting portion 221, for example. That is, the gas guide 216c can be arranged to vertically face the gas ejecting portion 221.

Still further, the shape and structure of the inflator 212, retainer main body 216c, and airbag 214 are not limited to those described in the illustrative embodiments, and may be set differently. By way of example, the retainer main body 216c may be provided with cooling means or device for cooling gas supplied from the inflator 212. The airbag 214 may be formed with an exhaust port for discharging gas supplied from the inflator 212.

The airbag system according to the present invention can be provided not only to the seat, but also to the pillar and other vehicles than the automotive vehicle.

As described above, according to the present invention, gas supplied from the gas supply portion of the inflator to the gas introduction portion is distributed to the chambers, passing between the inner holding portion of the fixture and the inflator. The closing means close the airbag to the inner holding portion through close contact therebetween, thus achieving easy enhancement in airtightness of the gas introduction portion, resulting in easy setting of the gas pressures within the chambers at respective desired values.

Further, the inner and outer holding portions of the fixture cooperate to hold the airbag involving its position facing an end of the partition, thus achieving easy enhancement in airtightness of the end of the partition, resulting in easy setting of the gas pressures within the chambers at respective desired values.

Still further, the partition has a part held by the inner and outer holding portions, thus achieving easy enhancement in airtightness of the end of the partition, resulting in easy setting of the gas pressures within the chambers at respective desired values.

Still further, the closing means comprise a back seal portion for joining the basic cloths together, wherein the inner holding portion is press fit into the back seal portion, thus achieving simplified structure, resulting not only in a reduction in the number of parts and assembling processes and thus in manufacturing cost, but also in weight saving.

Furthermore, the back seal portion comprises a sewing portion obtained by sewing the basic cloths and a reinforcing cloth with thread, thus achieving simplified structure, resulting not only in a reduction in the number of parts and assembling processes and thus in manufacturing cost, but also in weight saving. Moreover, the reinforcing cloth serves to restrain elongation of the basic cloths, achieving enhancement in airtightness.

Further, the member for enhancing airtightness also serves as member for guiding gas, achieving gas supply to the chambers in desired conditions without any increase in the number of parts.

Further, passenger's hip and chest are restrained by the first and second chambers which deploy in desired conditions.

Still further, passenger's abdomen is also restrained by the third chamber which deploys in a desired condition.

Still further, the airbag is quickly deployed toward passenger's hip and chest, achieving stable support of the passenger.

Furthermore, the first chamber corresponding to passenger's hip is deployed quickly sufficiently to stably support passenger's hip having relatively great mass by greater reaction force, whereas the second chamber in an area corresponding to passenger's shoulder is deployed quickly by gas guided by the gas guide means, restraining inclination of the passenger in reaction to deployment of the first chamber, achieving stable support of the passenger.

Further, the gas guide means are obtained by sewing the basic cloths together, allowing easy achievement of the gas guide means, resulting in simplified structure and reduced manufacturing cost of the airbag.

Further, the gas guide means also serve as means for restraining the dimension of the airbag at deployment, resulting in simplified structure and reduced manufacturing cost of the airbag.

Having described the present invention in connection with the preferred embodiments, it is noted that the present invention is not limited thereto, and various changes and modifications can be made without departing from the scope of the present invention.

The entire teachings of Japanese Patent Application P2004-131510 filed Apr. 27, 2004, Japanese Patent Application P2004-019647 filed Jan. 28, 2004, and Japanese Patent Application P2003-122706 filed Apr. 25, 2003 are hereby incorporated by reference.

What is claimed is:

1. An airbag system, comprising:
    an airbag including therein first and second chambers defined by a partition, and a gas introduction portion through which gas is introduced into the first and second chambers;
    an inflator having a gas supply portion and arranged opposite to an end of the partition so as to supply gas to the gas introduction portion of the air bag; and
    a gas guide member disposed in the gas introduction portion and air-tightly connected to an end of the partition so as to define a passage between the gas guide member and the gas supply portion of the inflator so that the gas is capable of flowing through the passage, the gas guide member being arranged to distribute gas from the gas supply portion of the inflator into the first and second chambers, wherein fluid communication between the first and second chambers is allowed only through the passage,
    the gas guide member being formed of a rigid sheet and having an inner surface which faces the gas supply portion of the inflator so that gas from the gas supply portion of the inflator strikes against the inner surface, the inner surface being curved to surround the gas supply portion of the inflator so as to define the passage between the inner surface and the gas supply portion of the inflator, the inner surface having first and second curved ends which are opposite to each other and separate from the gas supply portion of the inflator so that the first and second curved ends define respectively first and second ends of the passage, the first and second ends of the passage being respectively in communication with the first and second chambers, the inner surface being inclined so that a distance between the first curved end of the inner surface and the gas supply portion of the inflator is larger than a distance between the second curved end of the inner surface and the gas supply portion of the inflator.

2. The airbag system as claimed in claim 1, further comprising:
    a fixture which couples the airbag and the inflator, the fixture comprising an inner holding portion disposed in the gas introduction portion of the airbag through a predetermined space with respect to the gas supply portion; and
    a closing device which closes the airbag to the inner holding portion.

3. The airbag system as claimed in claim 2, wherein the fixture comprises an inner fixture including the inner holding portion, and an outer fixture disposed outside the airbag and involving a position of the airbag facing the end of the partition, the outer fixture including an outer holding portion constituting the closing device, the outer holding portion cooperating with the inner holding portion to hold the airbag.

4. The airbag system as claimed in claim 3, wherein the partition has a part held between the inner holding portion and the outer holding portion.

5. The airing system as claimed in claim 2, wherein the inner holding portion comprises the gas guide member arranged opposite to the gas supply portion, the gas guide member distributing gas to the chambers.

6. The airbag system as claimed in claim 2, wherein the airbag deploys sideward with respect to a seat occupant, wherein the chambers comprises a first chamber deploying toward a hip of the seat occupant and a second chamber located above the first chamber and deploying toward a chest of the seat occupant.

7. The airbag system as claimed in claim 6, wherein the chambers further comprise a third chamber located between the first and second chambers and deploying toward an abdomen of the seat occupant.

8. The airbag system as claimed in claim 1, wherein the closing device comprises a back seal portion for joining together base cloths which constitute the airbag, wherein the inner holding portion is press fit into the back seal portion.

9. The airbag system as claimed in claim 8, wherein the back seal portion comprises a sewing portion obtained by sewing the base cloths and a reinforcing cloth with thread.

10. The airbag system as claimed in claim 1, wherein the gas guide member is arranged to distribute portions of the gas into the first and second chambers at a distribution rate so as to control gas pressures to be supplied to the first and second chambers.

11. An airbag, comprising:

a first chamber which deploys sideward with respect to a hip of a seat occupant;

a second chamber located above the first chamber, the second chamber deploying sideward with respect to the seat occupant; and a gas guide device, the gas guide device comprising:

a gas guide member disposed in the gas introduction portion and air-tightly connected to the end of the partition so as to define a passage between the gas guide member and the gas supply portion of the inflator so that gas is capable of flowing through the passage, the gas guide member being arranged to distribute gas from the gas supply portion of the inflator into the first and second chambers, wherein fluid communication between the first and second chambers is allowed only through the passage, the gas guide member being formed of a rigid sheet and having an inner surface which faces the gas supply portion of the inflator so that gas from the gas supply portion of the inflator strikes against the inner surface, the inner surface being curved to surround the gas supply portion of the inflator so as to define the passage between the inner surface and the gas supply portion of the inflator, the inner surface having first and second curved ends which are opposite to each other and separate from the gas supply portion of the inflator so that the first and second curved ends define respectively first and second ends of the passage, the first and second ends of the passage being respectively in communication with the first and second chambers, the inner surface being inclined so that a distance between the first curved end of the inner surface and the gas supply portion of the inflator is larger than a distance between the second curved end of the inner surface and the gas supply portion of the inflator, and a bypass or conduct structure that preferentially guides gas introduced into the second chamber to an area of the airbag corresponding to a shoulder of the seat occupant.

12. The airbag as claimed in claim 11, further comprising:

a partition which defines the first and second chambers; and a gas introduction portion arranged opposite to an end of the partition, the gas introduction portion being supplied with gas, the gas introduction portion directly communicating with the first chamber.

13. The airbag as claimed in claim 11, further comprising:
two base cloths which constitute an outer shell of the second chamber,
wherein the gas guide device is obtained by sewing the base cloths together.

14. The airbag as claimed in claim 11, further comprising:
two base cloths which constitute an outer shell of the second chamber,
wherein the gas guide device comprises a coupling device for coupling the base cloths together to restrain a dimension of their separation.

15. An airbag system comprising:

an airbag including therein first and second chambers defined by a partition, and a gas introduction portion through which gas is introduced into the first and second chambers;

an inflator having a gas supply portion and arranged opposite to an end of the partition so as to supply gas to the gas introduction portion of the air bag; and a gas guide member disposed in the gas introduction portion and air-tightly connected to the end of the partition so as to define a passage between the gas guide member and the gas supply portion of the inflator so that gas is capable of flowing through the passage, the gas guide member being arranged to distribute gas from the gas supply portion of the inflator into the first and second chambers, wherein fluid communication between the first and second chambers is allowed only through the passage, the gas guide member being formed of a rigid sheet and having a generally frustoconical inner surface which faces the gas supply portion of the inflator so that gas ejected from the gas supply portion of the inflator directly strikes against the inner surface, the inner surface being curved to surround the gas supply portion of the inflator so as to define the passage between the inner surface and the gas supply portion of the inflator, the inner surface having first and second curved ends which are opposite to each other and separate from the gas supply portion of the inflator so that the first and second curved ends define respectively first and second ends of the passage, the first and second ends of the passage being respectively in communication with the first and second chambers, the inner surface being inclined to an axis of the inflator so that a distance between the first curved end of the inner surface and the axis of the inflator is larger than a distance between the second curved end of the inner surface and the axis of the inflator.

16. An airbag system as claimed in claim 15, wherein the rigid sheet is a metal sheet.

* * * * *